United States Patent
Wei

(10) Patent No.: US 10,975,546 B2
(45) Date of Patent: Apr. 13, 2021

(54) SYSTEM AND METHOD OF LAYERING MATERIAL

(71) Applicant: Caterpillar Inc., Deerfield, IL (US)

(72) Inventor: Mo Wei, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 257 days.

(21) Appl. No.: 15/984,840

(22) Filed: May 21, 2018

(65) Prior Publication Data

US 2019/0352880 A1 Nov. 21, 2019

(51) Int. Cl.
| | |
|---|---|
| *E02F 3/84* | (2006.01) |
| *E02F 9/20* | (2006.01) |
| *G05D 1/00* | (2006.01) |
| *G05D 1/02* | (2020.01) |
| *E02F 3/43* | (2006.01) |

(52) U.S. Cl.
CPC .............. *E02F 3/841* (2013.01); *E02F 3/435* (2013.01); *E02F 3/847* (2013.01); *E02F 9/205* (2013.01); *G05D 1/0088* (2013.01); *G05D 1/0274* (2013.01); *G05D 1/0278* (2013.01); *G05D 2201/0202* (2013.01)

(58) Field of Classification Search
CPC . E02F 3/841; E02F 3/435; E02F 3/847; E02F 9/205; G05D 1/0088; G05D 1/0274; G05D 1/0278; G05D 2201/0202
See application file for complete search history.

(56) References Cited

U.S. PATENT DOCUMENTS

| | | | | |
|---|---|---|---|---|
| 5,636,903 | A * | 6/1997 | Dickerson | E21C 41/26 299/36.1 |
| 9,481,977 | B1 * | 11/2016 | Clar | E02F 9/2045 |
| 9,523,183 | B2 * | 12/2016 | Wei | E02F 9/2045 |
| 9,702,115 | B1 * | 7/2017 | Darukhanavala | E02F 9/26 |
| 9,760,081 | B2 * | 9/2017 | Taylor | E02F 9/2045 |
| 9,783,955 | B1 * | 10/2017 | Clar | G05D 1/0219 |
| 9,803,336 | B2 * | 10/2017 | Wei | E02F 3/845 |
| 9,909,284 | B2 * | 3/2018 | DeVore | E02F 9/262 |
| 10,689,981 | B2 * | 6/2020 | Hall | E21F 13/02 |
| 2014/0032030 | A1 * | 1/2014 | Stratton | E02F 3/841 701/23 |
| 2016/0163088 | A1 * | 6/2016 | Clar | E02F 9/2054 701/23 |
| 2017/0138016 | A1 * | 5/2017 | Wei | E02F 9/205 |
| 2018/0038070 | A1 * | 2/2018 | Hashimoto | E02F 3/847 |
| 2019/0078297 | A1 * | 3/2019 | Ishibashi | E02F 3/841 |
| 2019/0078301 | A1 * | 3/2019 | Ishibashi | E02F 3/844 |
| 2019/0093315 | A1 * | 3/2019 | Ishibashi | E02F 3/7609 |
| 2019/0352886 | A1 * | 11/2019 | Harada | G05D 1/0212 |

* cited by examiner

*Primary Examiner* — Nadeem Odeh
*Assistant Examiner* — Nicholas K Morgan
(74) *Attorney, Agent, or Firm* — Xsensus

(57) ABSTRACT

A system for moving material from a first work area to a second work includes a material moving machine, a machine position sensor and a controller system. The controller system performs first material moving operations including determining a transition location from an inclined material stack operation to a flat material stack operation. The controller system performs second material moving operations including controlling the material moving machine.

17 Claims, 8 Drawing Sheets

SYSTEM AND METHOD OF LAYERING MATERIAL

TECHNICAL FIELD

This document pertains generally, but not by way of limitation, to controlling a machine and, more particularly, to a system and method for controlling a material moving machine and layering material.

BACKGROUND

Machines such as dozers, motor graders, wheel loaders, etc., are used to perform a variety of tasks. For example, these material moving machines may be used to move material at a work site. The machines may operate in an autonomous or semi-autonomous manner to perform these tasks in response to commands generated as part of a work plan for the machines. The machines may receive instructions in accordance with the work plan to perform operations including digging, loosening, carrying, etc., different materials at the work site such as those related to mining, earthmoving and other industrial activities.

Autonomously operated machines may remain consistently productive without regard to a human operator or environmental conditions. In addition, autonomous systems may permit operation in environments that are unsuitable or undesirable for a human operator. Autonomous or semi-autonomous systems may also compensate for inexperienced human operators as well as inefficiencies associated with repetitive tasks.

In some operations such as mining, it is desirable to move material from one location to another, such as to expose a layer of material to be mined. When these material moving operations are performed by machines such as dozers, the material is moved as a plurality of layers with each layer being stacked or laid upon the previously formed layer. The layer creation process may be inefficient and uneven layers may result in inefficient and unsteady movement over the previously formed layers. See U.S. Pat. No. 9,783,955 which discloses a controller-implemented method for moving material with a machine at a work site.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein.

SUMMARY

In one embodiment, a computer-implemented method of controlling a material moving machine is provided. The computer-implemented method comprises monitoring, by a control system, a location of the material moving machine in a work area. The control system calculates a target elevation of a material layer and controls the material moving machine to locate material as the material moving machine travels along an inclined surface while the material moving machine is located below the target elevation. The material moving machine is controlled by the control system to locate material as the material moving machine travels along a horizontal path while the material moving machine is located above the target elevation.

In another embodiment, a control system is provided for controlling operation of a material moving machine. The control system comprises a memory configured to retrievably store one or more algorithms, and a controller in communication with the memory. The controller, based on the one or more algorithms, is configured to instruct the material moving machine to move material from a first work area to a second work area. The controller instructs the material moving machine to travel along an incline path in the second work area while the material moving machine is located below a target elevation, and instructs the material moving machine to transition from the incline path to a horizontal path in the second work area when the location of the material moving machine is above the target elevation.

An autonomous method of mining using a dozer is described. The dozer includes a drive mechanism to move the dozer in forward and reverse directions, an adjustable blade for pushing material when the dozer moves in the forward direction, and a location position sensor to determine a position of the dozer. The autonomous method comprises monitoring the location of the dozer, calculating a target elevation of a material layer to be formed in a work area, and providing first instructions to the drive mechanism and the adjustable blade of the dozer to move the dozer toward the work area while pushing material. The location of the dozer is compared to the target elevation in the work area, and second instructions are provided to the drive mechanism and the adjustable blade of the dozer to move the dozer along an incline path in the work area while the dozer location is below the target elevation to locate first pushed material along the inclined path to form a first part of the material layer. Third instructions are provided to the drive mechanism and the adjustable blade of the dozer to transition the dozer from the incline path to a horizontal path when the dozer location reaches an elevation equal to the target elevation to locate second pushed material along the horizontal path to form a second part of the material layer.

DETAILED DESCRIPTION

Figure 1:
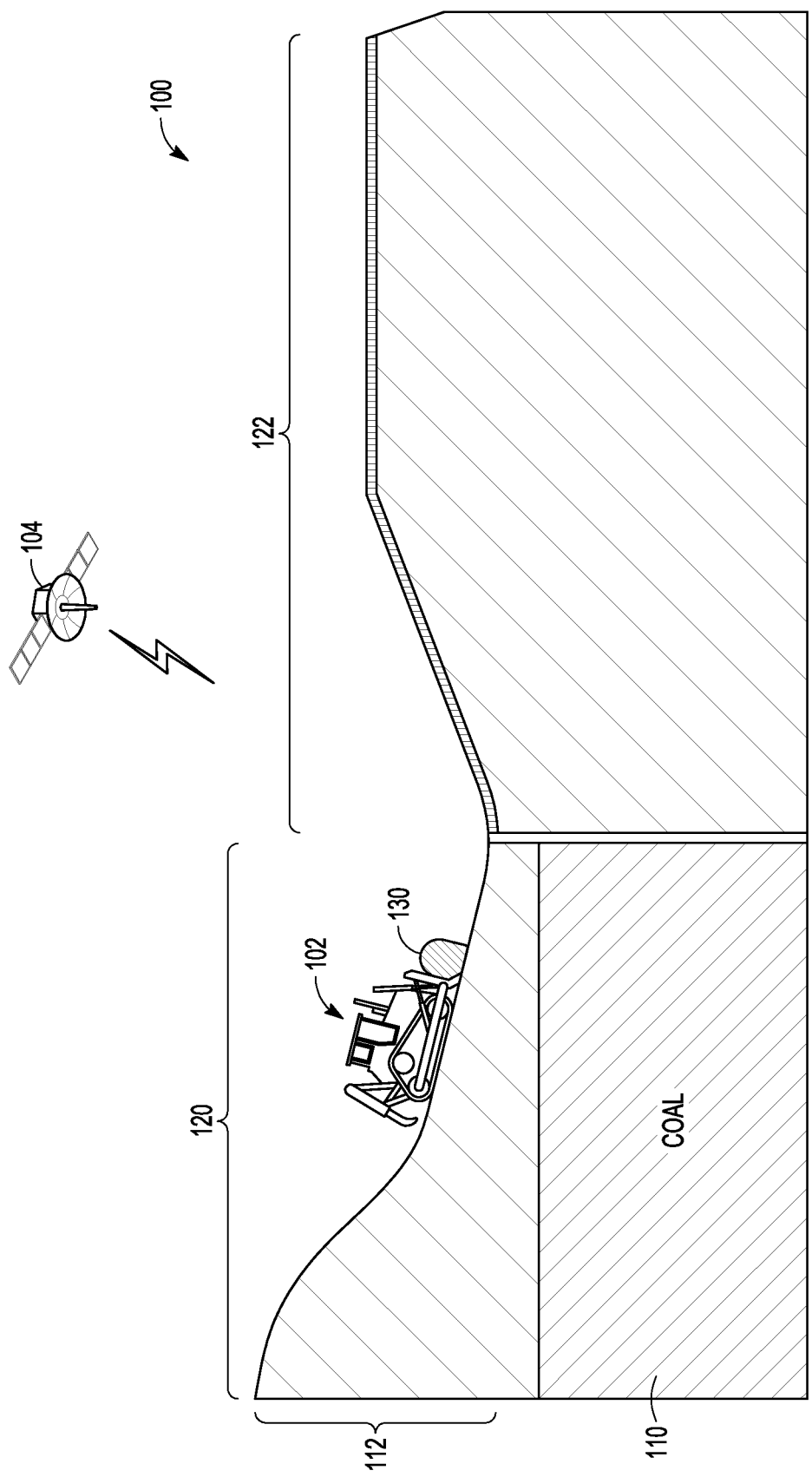
FIG. 1 illustrates one exemplary worksite with a machine in accordance with this disclosure.

Referring now to FIG. 1, one exemplary worksite 100 is illustrated with a moving machine 102 performing predetermined tasks. Although material moving machine 102 is disclosed as a unitary machine it is contemplated that multiple material moving machines may be used on worksite 100. The worksite 100 may include, for example, a mine site, a landfill, a quarry, a construction site, or any other type of worksite. The predetermined task may be associated with altering the geography at the worksite 100, such as a dozing operation, a grading operation, a leveling operation, a bulk material removal operation, or any other type of operation that results in geographical modifications within the worksite 100. The machines 102 may be mobile machines configured to perform operations associated with industries related to mining, construction, farming, or any other industry known in the art. The machine 102 depicted in FIG. 1, for example, may embody an earth moving machine, such as a dozer having a blade or other work tools or implements movable by way of one or more actuators. The machine 102 may also include manned machines or any type of autonomous or semi-autonomous machine.

The overall operation of the machine 102 and implements within the worksite 100 may be managed by a control system (not shown in FIG. 1) that is at least partially in communication with the machine 102. Moreover, each machine 102 may include any one or more of a variety of feedback devices capable of signaling, tracking, monitoring, or otherwise communicating relevant machine information to the control system. For example, each machine 102 may include a locating device configured to communicate with one or more satellites 104, which in turn, may communicate to the control system various information pertaining to the position and/or orientation of the machine 102 relative to the worksite 100. Each machine 102 may additionally include one or more implement sensors configured to track and communicate position and/or orientation information of the implements to the control system. Furthermore, implement load, such as the relative weight of any material that is loaded into or carried by, for instance, the blade of a dozing machine, may be inferred from engine load, track slip, and the like.

Work site 100 is depicted as a mining site with lower layer 110 of material to be mined such as coal and an upper layer 112 of material such as overburden or topsoil that covers the lower layer 110. At some work sites 100 it may be contemplated that the upper layer 112 is removed from above a portion of the lower layer 110 of material at a first work area 120, referred to as the cut area, and moved to a second work area 122, referred to as the fill area. The exposed lower layer 110 of material is then removed and transported to a desired location at a collection site (not shown). In some instances, the process of movement of the upper layer 112 may be initiated by moving a portion of the upper layer 112 into voids (not shown) located in second area 122. The upper layer 112 is moved by machine 102 from the first work area 120 to second work area 122 one load at a time. In one embodiment, the machine is a dozer that pushes the overburden material, referred to herein as material pile 130, and material piles 400-411 (see FIGS. 4-7).

Figure 2:
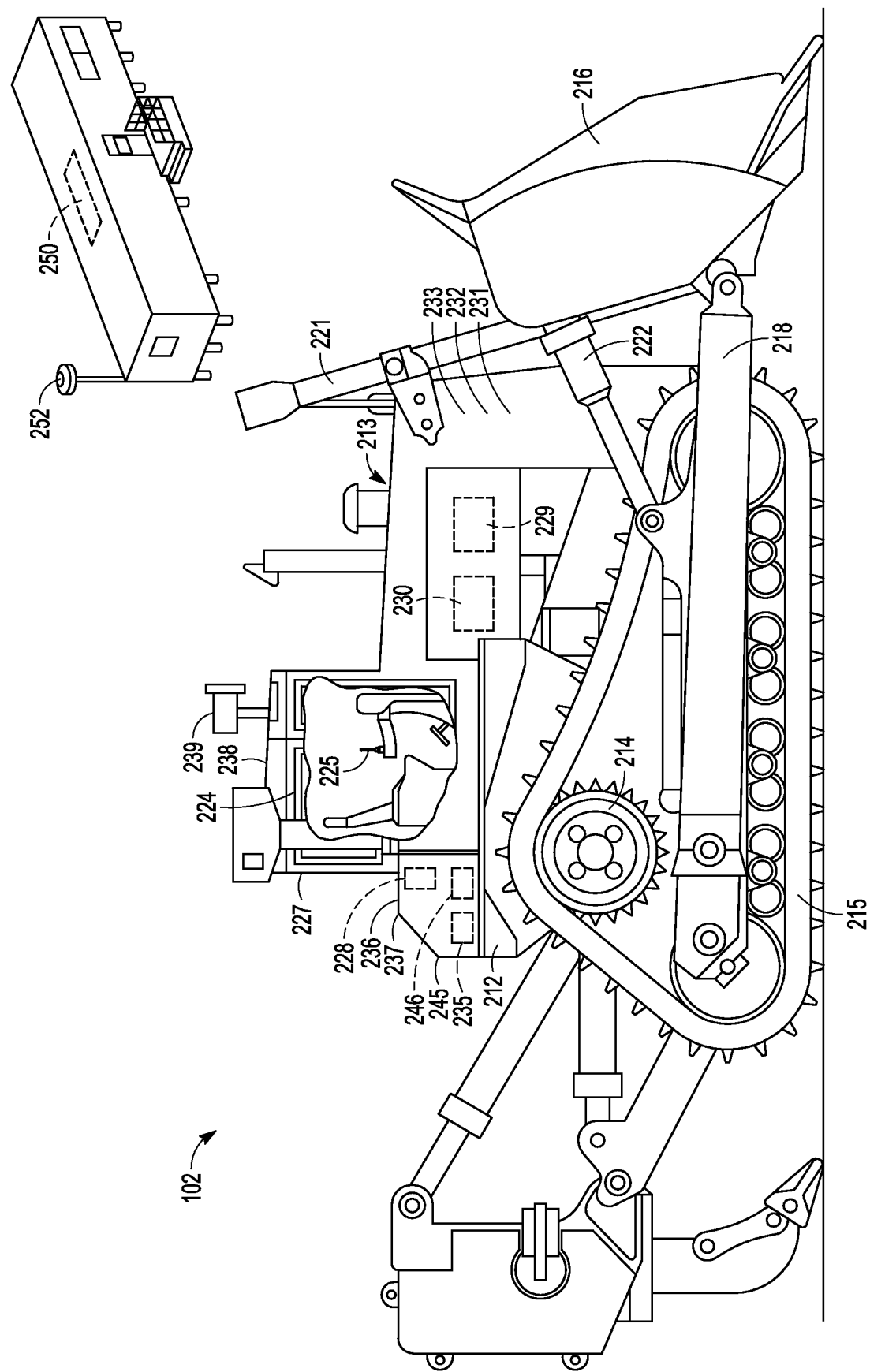
FIG. 2 depicts a diagrammatic illustration of a machine such as a dozer.

FIG. 2 depicts a diagrammatic illustration of a machine 102 such as a dozer, or track type tractor, with a ground engaging work implement such as a blade 216 configured to push material. The machine 102 includes a frame 212 and a prime mover such as an engine 213. A ground-engaging drive mechanism such as a track 215 may be driven by a drive sprocket 214 to propel the machine. Engine 213 is operatively connected to a transmission (not shown) which is operatively connected to the drive sprockets 214 to drive tracks 215. The systems and methods of the disclosure may be used with any machine propulsion and drivetrain mechanisms applicable in the art for causing movement of the machine including hydrostatic, electric, or mechanical drives.

Blade 216 may be pivotably connected to frame 212 by arms 218 on each side of machine 102. First hydraulic cylinder 221 coupled to frame 212 supports blade 216 in the vertical direction and allows blade 216 to move up or down vertically from the point of view of FIG. 2. Second hydraulic cylinders 222 on each side of machine 102 allow the pitch angle of blade tip to change relative to a centerline of the machine.

Machine 102 may include a cab 224 that an operator may physically occupy and provide input to control the machine. Cab 224 may include one or more input devices such as joystick 225 through which the operator may issue commands to control the propulsion system and steering system of the machine as well as operate various implements associated with the machine.

Machine 102 may be controlled by a control system 245. The control system 245 may include an electronic control module or controller 246 and a plurality of sensors. The controller 246 may receive input signals from an operator operating the machine 102 from within cab 224 or off-board through a wireless communications system 252. The controller 246 may control the operation of various aspects of the machine 102 including the drivetrain and the hydraulic systems.

The controller 246 may be an electronic controller that performs operations, executes control algorithms, stores and retrieves data and other desired operations. The controller 246 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 246 such as power supply circuitry, signal conditioning circuitry, driver circuitry, and other types of circuitry.

The controller 246 may be a single controller or may include more than one controller disposed to control various functions and/or features of the machine 102. The term "controller" is meant to be used in its broadest sense to include one or more controllers and/or microprocessors that may be associated with the machine 102 and that may cooperate in controlling various functions and operations of the machine. The functionality of the controller 246 may be implemented in hardware and/or software without regard to the functionality. The controller 246 may rely on one or more data maps relating to the operating conditions and the operating environment of the machine 102 and the work site 100 that may be stored in the memory of controller. Each of these data maps may include a collection of data in the form of tables, graphs, digital images and/or equations.

The control system 245 and the controller 246 may be located on the machine 102 and may also include components, such as additional controllers or processors, located remotely from the machine such as at a command center 250. Command center 250 may include or access memory, secondary storage devices, processors, and any other components for running an application. The functionality of control system 245 may be distributed so that certain functions are performed at machine 102 and other functions are performed remotely. In such case, the control system 245 may include a communications system such as wireless communications system 252 for transmitting signals between the machine 102 and a controller system located remote from the machine.

The control system 245 may be implemented in any number of different arrangements. For example, the control system 245 may be at least partially implemented at command center 250 situated locally and/or remotely relative to the worksite 100 with sufficient means for communicating with the machines 102, for example, via satellites 104, or the like. Additionally, or alternatively, the control system 245 may be implemented using one or more computing devices with means for communicating with one or more of the machines 102 or one or more command centers 250 that may be locally and/or remotely situated relative to the worksite 100. In still further alternatives, the control system 245 may be implemented on-board any one or more of the machines 102 that are also provided within the worksite 100. Other suitable modes of implementing the control system 245 are possible and will be understood by those of ordinary skill in the art.

Using any of the foregoing arrangements, the control system 245 may generally be configured to monitor the position of the machine 102 relative to the worksite 100 and a predetermined target operation, and provide instructions for controlling the machines 102 in an efficient manner in executing the target operation. In certain embodiments, the machines 102 may be configured to excavate areas of a worksite 100 according to one or more predefined excavation plans. The excavation plans can include, among other things, determining the location, size, and shape of a plurality of cuts into an intended work surface 112 at the worksite 100. In such embodiments, the control system 245 may be used to plan not only the overall excavation, but also to define an implement path of the work surface 122. For a given work surface 112 and pass, for instance, the control system 245 may define a blade path, composed of a loading profile and a carry profile, best suited to guide the machines 102 in an efficient, productive and predictable manner. Although described in connection with planned cut profiles and passes along a work surface 122, the control system 245 may similarly be employed in conjunction with other types of tasks.

Machine 102 may be configured to be operated autonomously, semi-autonomously, or manually. When operating semi-autonomously or manually, the machine 102 may be operated by remote control and/or by an operator physically located within the cab 224.

Machine 102 may be equipped with a plurality of machine sensors that provide data indicative (directly or indirectly) of various operating parameters of the machine and/or the operating environment in which the machine is operating. The term "sensor" is meant to be used in its broadest sense to include one or more sensors and related components that may be associated with the machine 102 and that may cooperate to sense various functions, operations, and operating characteristics of the machine and/or aspects of the environment in which the machine is operating.

A position sensing system 227 may include a position sensor 228, also shown generally by an arrow in FIG. 2 to indicate association with the machine, to sense the position and orientation (i.e., the heading, pitch, roll or tilt, and yaw) of the machine relative to the work site 100. The position sensor 228 may include a plurality of individual sensors that cooperate to generate and provide position signals to controller 246 indicative of the position and orientation of the machine 102. In one example, the position sensor 228 may include one or more sensors that interact with a positioning system such as a global navigation satellite system or a global positioning system to operate as a position sensor. In another example, the position sensor 228 may further include a slope or inclination sensor such as pitch angle sensor for measuring the slope or inclination of the machine 102 relative to a ground or earth reference. The controller 246 may use position signals from the position sensors 228 to determine the position of the machine 102 within work site 100. In other examples, the position sensor 228 may include a perception based system, or may use other systems such as lasers, sonar, or radar to determine all or some aspects of the position of machine 102.

The position sensing system 227 may also be used to determine a ground speed of machine 102. Other sensors or a dedicated ground speed sensor may alternatively be used to determine the ground speed of the machine 102. In addition, the position sensing system 227 may also be used to determine the position of the work surface upon which the machine 102 is moving. More specifically, based upon known dimensions of the machine 102 and the position of the machine at the work site 100, the position of the work surface may also be determined. As a result, the position sensing system 227 may operate as either or both of a machine position sensing system and a work surface position sensing system. Similarly, the position sensor 228 may operate as either or both of a machine position sensor and a work surface position sensor. Other sensors or a dedicated work surface position sensor may alternatively be used to determine the position of the work surface.

Sensors may be provided to monitor the operating conditions of the engine 213 and drivetrain such as an engine speed sensor 229 and a torque converter speed sensor 230. Other sensors necessary or desirable for operating the machine 102 may be provided.

The control system 245 may include an additional system such as a change in terrain detection system 231. One type of change in terrain detection system 231 that may be used to sense a crest at the work site 100 may be an implement load monitoring system 232. The implement load monitoring system 232 may include any of a variety of different types of implement load sensors 233 to measure the load on the ground engaging work implement or blade 216. For example, as blade 216 of machine 102 moves material over a crest, the load on the blade will be reduced. Accordingly, the implement load sensor system 233 may be utilized to measure or monitor the load on the blade 216 and a decrease in load may be registered by the controller 246 as a change in terrain due to the machine 102 being adjacent the crest. In other instances, an increase in load may indicate an incline or the machine 102 encountering a pile of material. In other words, the controller 246 may determine a change in terrain based at least in part upon a change in the load on blade 216.

In one embodiment, the implement load sensor system 233 may embody one or more pressure sensors for use with one or more hydraulic cylinders, such as second hydraulic cylinders 222, associated with blade 216. Signals from the pressure sensor indicative of the pressure within the second hydraulic cylinders 222 may be monitored by controller 246. Upon receipt of a signal indicating a substantial reduction in pressure within the second hydraulic cylinders 222, the controller 246 may determine that the load on blade 216 has been substantially reduced due to the material having been pushed over a crest. Other manners of determining a reduction in cylinder pressure associated with a reduction in the load on blade 216 are contemplated, including other manners of measuring the pressure within second hydraulic cylinders 222 and measuring the pressure within other cylinders associated with the blade. An increase in pressure indicative of an increase in load may be determined in a similar manner.

In another embodiment, the implement load sensor system 233 may embody sensors for measuring a difference between output from the engine 213 and the output from a torque converter (not shown). More specifically, the engine speed sensor 229 may be utilized to generate a signal indicative of the speed or output of the engine 213 and the torque converter speed sensor 230 may be utilized to monitor the output speed of the torque converter. During an operation such as moving material 130 with blade 216, as shown in FIG. 1, the engine output speed indicated by engine speed sensor 229 and the torque converter output speed indicated by torque converter speed sensor 230 may be relatively constant. Upon moving material over a crest with blade 216, the load on the blade will be substantially reduced and thus cause a change in the relative speeds between the engine 213 and the torque converter. Similarly, an opposite change in relative speeds may also be used to determine an incline. Accordingly, by monitoring the difference between the engine speed and the torque converter speed, changes in incline may be determined.

Other manners of measuring differences between prime mover output and other components within the propulsion and drivetrain mechanisms that are reflective of a change in load on the implement are also contemplated by the present disclosure and understood by those with ordinary skill in the art. Still further, in alternate embodiments in which the machine propulsion and drivetrain mechanisms are hydrostatic or electric, the implement load sensor system may embody other sensors that detect a difference between output from the prime mover and other aspects of the propulsion and drivetrain mechanisms that may be used by the controller 246 to detect a change in load on the blade 216.

In still another embodiment, implement load sensor system 233 may embody an acceleration sensor such as a three-axis accelerometer 235 for providing an acceleration signal indicative of the acceleration of the machine 102. Upon moving a load of material past a crest, the machine 102 may accelerate due to the reduction in load on the blade 216. Similarly, deceleration of the machine 102 may indicate that the machine 102 has encountered an incline. Controller 246 may utilize acceleration of the machine 102 to determine a change in terrain.

In addition to the implement load monitoring systems 232 described above, other change in terrain detection systems may be used either alone or in combination with more than one change in terrain detection system. For example, a change in terrain detection system may use other sensors as a change in terrain sensor for determining a change in terrain. In one example, a pitch angle, as indicated by a pitch angle sensor 236, that exceeds a threshold pitch angle or is outside of an expected range of pitch angles may indicate that the machine 102 is adjacent a crest or an incline. In another example, a change in pitch rate as indicated by a pitch rate sensor 237 that exceeds a threshold rate may indicate that the machine 102 is adjacent a crest or an incline.

Still further, additional systems and sensors may be used to determine a change in terrain or proximity of machine 102 to a crest or an incline. For example, a perception system 238 may also be used to detect the physical location of a crest or an incline. The perception system 238 may be mounted on or associated with the machine. The perception system 238 may include one or more systems such as a radar system, a SONAR system, a LIDAR system, a camera vision system, and/or any other desired system that operate with associated perception sensors 239. Perception sensors 239 may generate data that is received by the controller 246 and used by the controller to determine the position of the work surface upon which the machine 102 is operating including the presence and position of obstacles within the range of the sensors. If desired, the perception system 238 may be used to generate an electronic map and/or images of the environment around machine 102 and the environment analyzed for changes in terrain.

In addition, or the alternative, the perception system 238 may include one or more perception sensors 239 movably associated with the machine 102 such as sensors mounted on a mobile machine or device including a drone or unmanned aerial vehicle (not shown).

Figure 3:
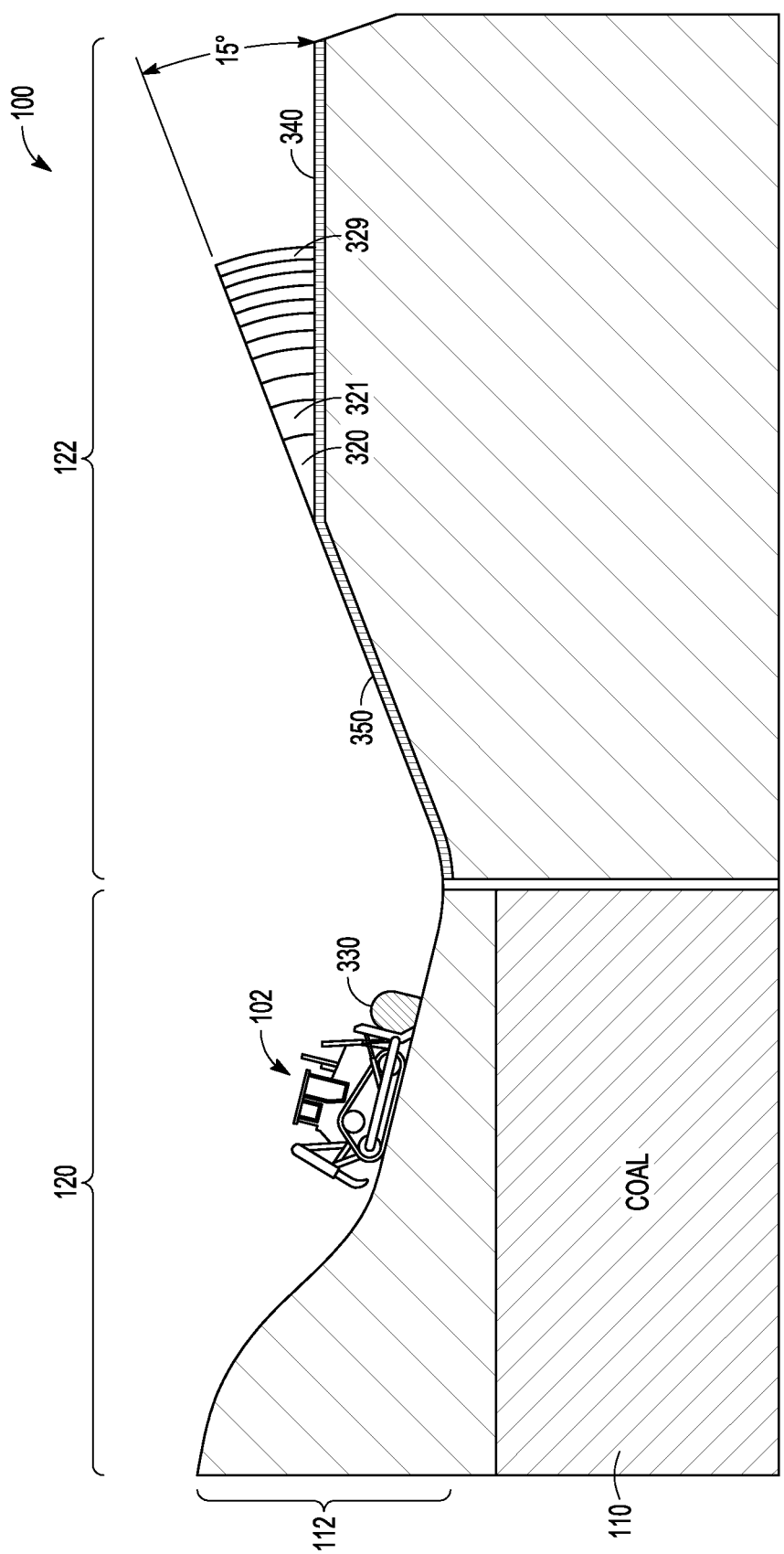
FIG. 3 illustrates a representative prior art up-push to edge operation in a mining operation.

Referring to FIG. 3, a prior art up-push to edge stacking operation is illustrated where a dozer 102 moves material 330. The dozer pushes material 330 up an incline surface 350. The dozer operates on the incline surface to stack the material. The incline surface is typically at an angle of approximately fifteen degrees to horizontal, such as surface 340.

In operation, the dozer moved, or pushed, material 320 above surface 340 and reversed its direction to retrieve more material. On subsequent material movement operations, the dozer deposits material 321-329 along incline surface 350. It will be appreciated by those skilled in the art that as the height of the material stack increases, the width of the material that is deposited is reduced. That is, material 320 occupies more surface area on surface 340 than material 329.

As dozer 102 reaches a crest node of the stack, material 330 begins to cascade over the node. The load on dozer 102, therefore, is reduced as the material being pushed by the dozer is reduced. Controlling the dozer in an up push to edge stacking operation is complicated by the height of the stack and the angle of the stack. Specifically, it is difficult to accurately sensing the effect of gravity while the dozer pushes material over the crest node to ensure the material is properly located without the dozer moving too far which could result in an accident.

Referring to FIGS. 4-7, a method of stacking material is described where material is removed from the first work area 120 and stacked in second work area 122 by the machine 102. The material is stacked in successive layers having a thickness of approximately three to five feet (or 1.2 meters). Each layer is started at a location in the second work area 122 closest to first work area 120 as the machine moves material one material load 400 at a time.

Figure 4:
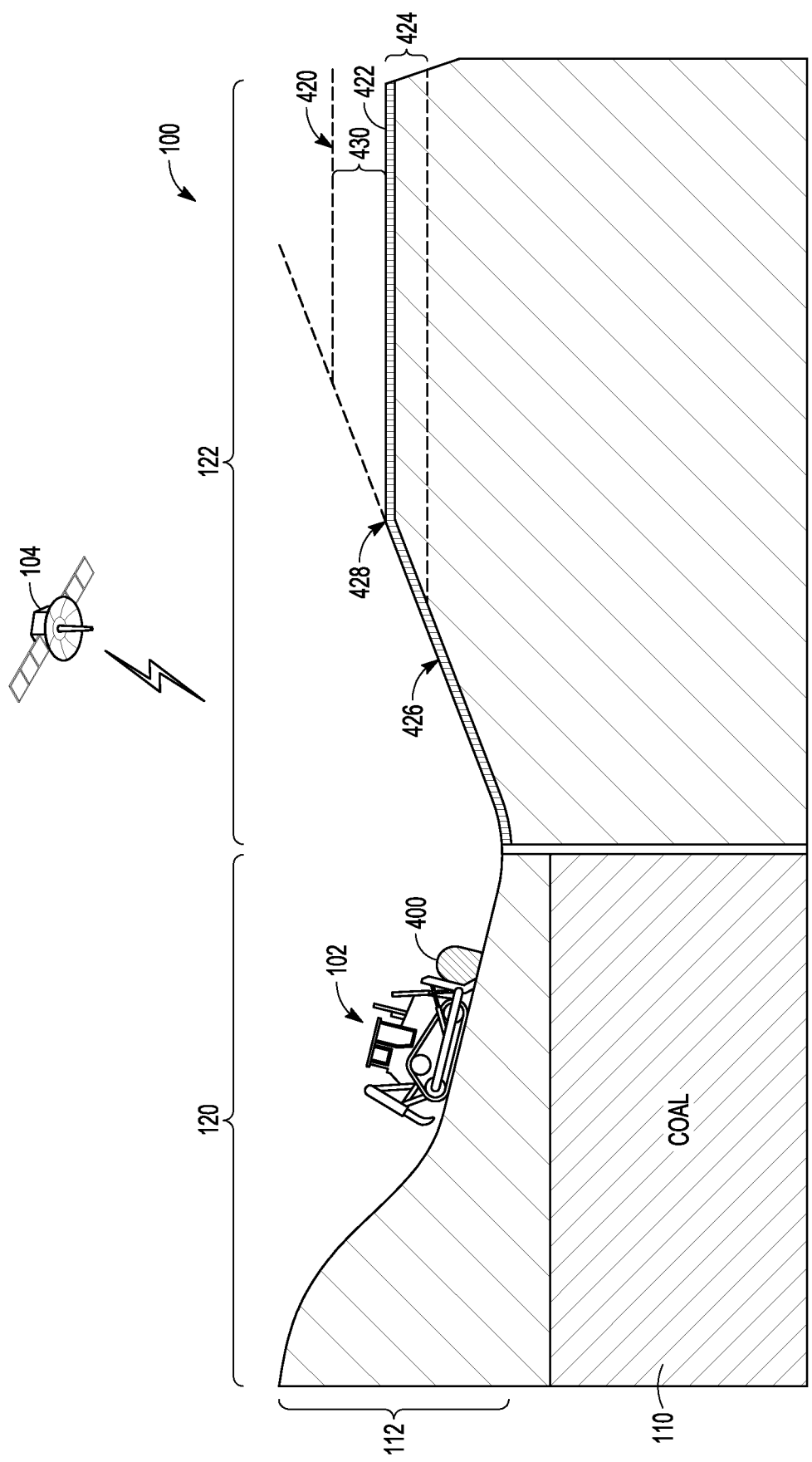
FIGS. 4-7 illustrate a transitioned incline to flat push to edge material stacking operation.

Referring to FIG. 4, control system 245 monitors the location and elevation of machine 102 relative to the work site 100 and controls the machine to move material to an elevation 420 above the top surface 422 of the last layer 424. Elevation 420 represents a target elevation of the top surface of new material stack layer 430 to be formed. The control system calculates the target elevation 420 by retrieving from memory a top elevation 422 of a last formed material layer 424, and calculates the target elevation based on the top elevation 422 and a target material layer thickness, such as 1.2 meters.

Figure 5:
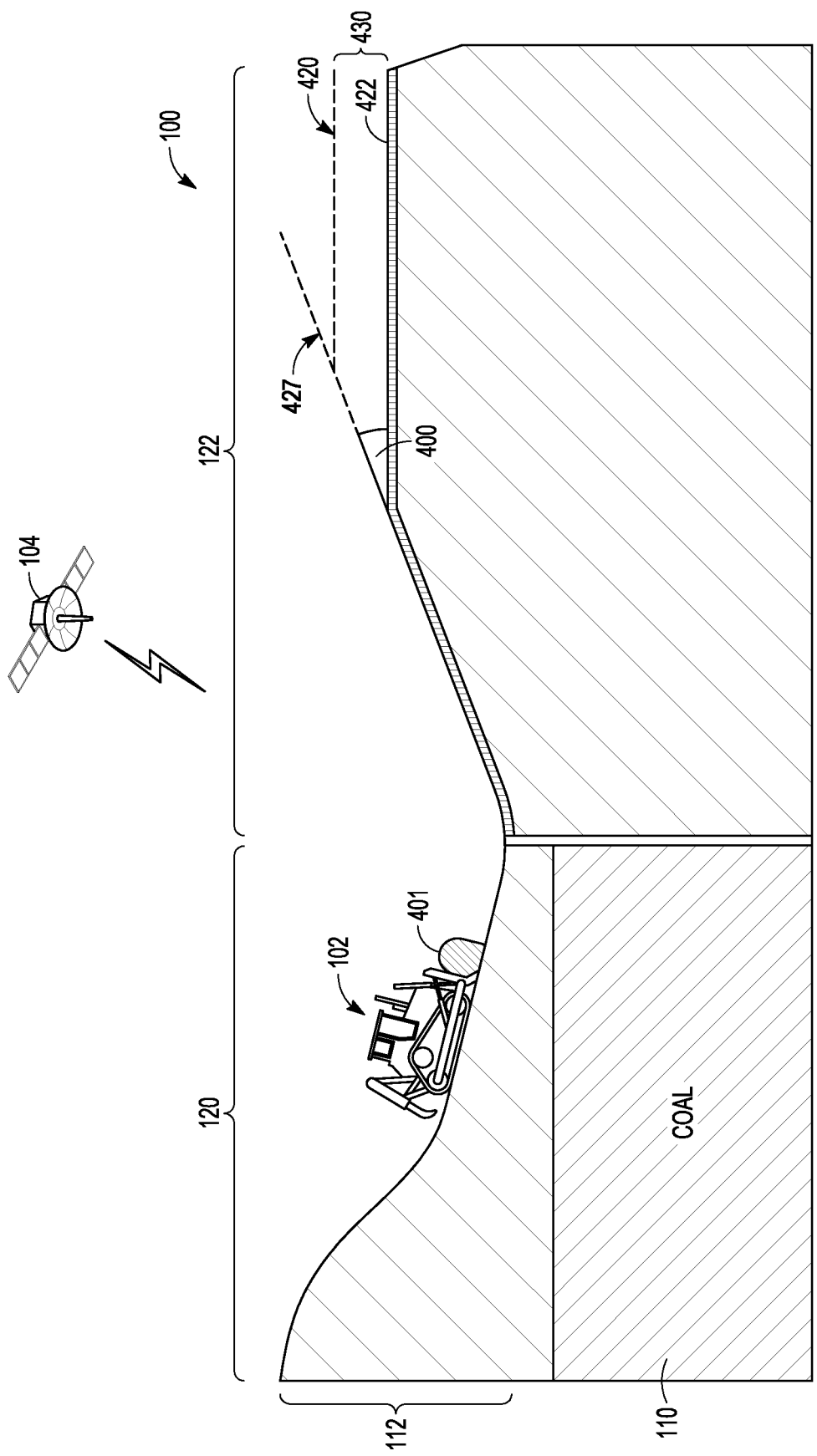

The control system 245 controls the machine to push the material 400 along incline path 426 in second work area 122. The incline can be set to any desired angle, such as in one embodiment, fifteen degrees relative to horizontal. The machine is controlled to push material 400 above top surface 422 as shown in FIG. 5.

Figure 6:
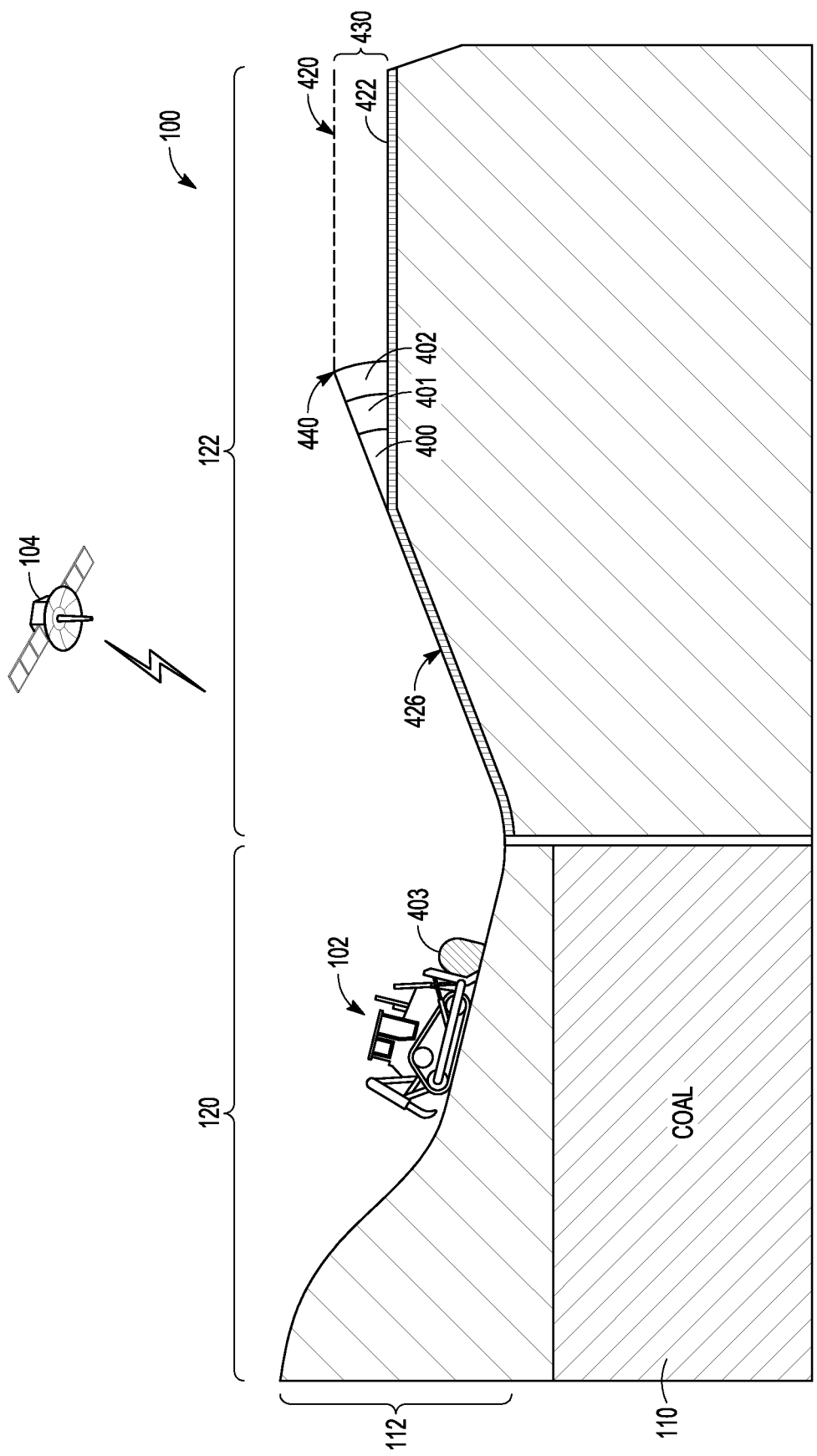

Referring to FIG. 6, subsequent material 401 and 402 are pushed up to the edge of the previously placed material 400 and 401, respectively, as described above, by sensing a load on machine 102. In one embodiment, the control system monitors outputs of sensors of the dozer 102 while the dozer is located within the work area 122, calculates a load on the dozer based upon the sensor outputs 233, and provides instructions to the dozer to reverse direction from a forward direction to a reverse direction if the calculated load is below a predetermined threshold load level.

Control system 245 determines when the deposited material reaches an elevation threshold above top surface 422. In one embodiment, the location of machine 102 is monitored by the control system and compared to the elevation of top surface 422. When the elevation of the machine, representing the elevation of the deposited material, reaches, or exceeds, an elevation differential, such as 1.2 meters, the control system 245 controls the machine 102 to deposit material 403 to form horizontal material stack layer 430 with a top surface 420.

Figure 7:
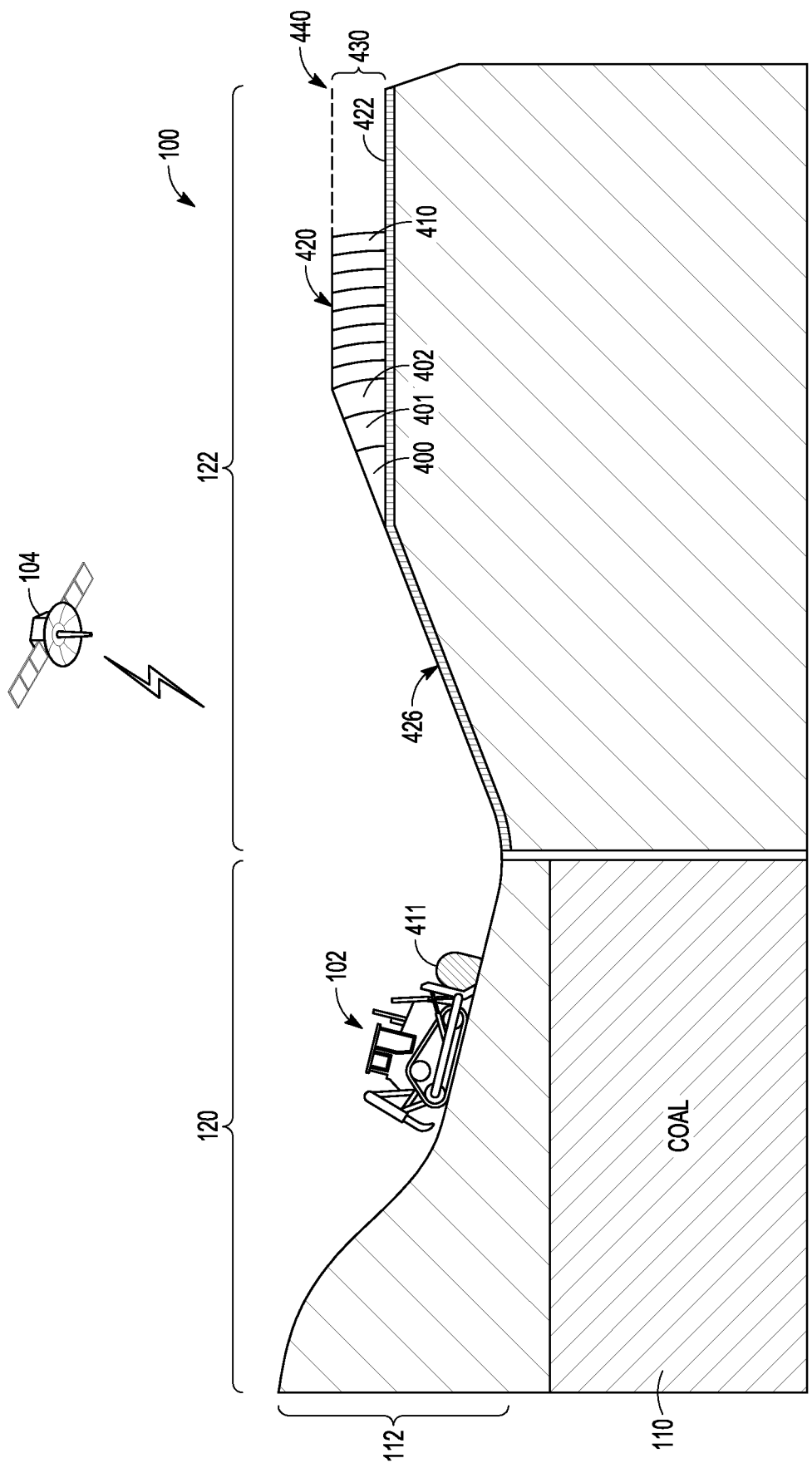

Referring still to FIG. 6, in one embodiment, the machine 102 is a dozer having blade 216 that is controlled to push material 403 along incline path 426 until it reaches transition point 440 where incline path 426 intersects with the top 420 of horizontal layer 430 to be formed. At that location, the control system 245 controls the dozer to adjust the blade to move material 403 in a horizontal path. For example, first hydraulic cylinder 221 and second hydraulic cylinder 222 are controlled to adjust a blade 216 to change the direction of the material being pushed by the blade. As illustrated in FIG. 7, material 403 to 410 have been located to form part of material stack layer 430 by controlling machine 102 to transition from incline path 426 to horizontal path along target elevation 420. Machine 102 is controlled to move material 411 until it reaches an edge of material 410, where a load on the machine is monitored to determine when material 411 has been properly located to continue formation of material stack layer 430. Machine 102 is controlled to stack material along surface 422 until it has reached a predetermined stop location, such as location 440, and then the machine is controlled to begin stacking material above layer 430 to form a new layer.

INDUSTRIAL APPLICABILITY

In general, the present disclosure sets forth methods, devices and systems for controlling machines 102, where there are motivations to promote predictability and improve overall efficiency and productivity. Although applicable to any type of machine, the present disclosure may be particularly applicable to autonomously or semi-autonomously controlled dozing machines where the dozing machines are controlled along particular travel routes within a worksite to excavate materials.

Figure 8:
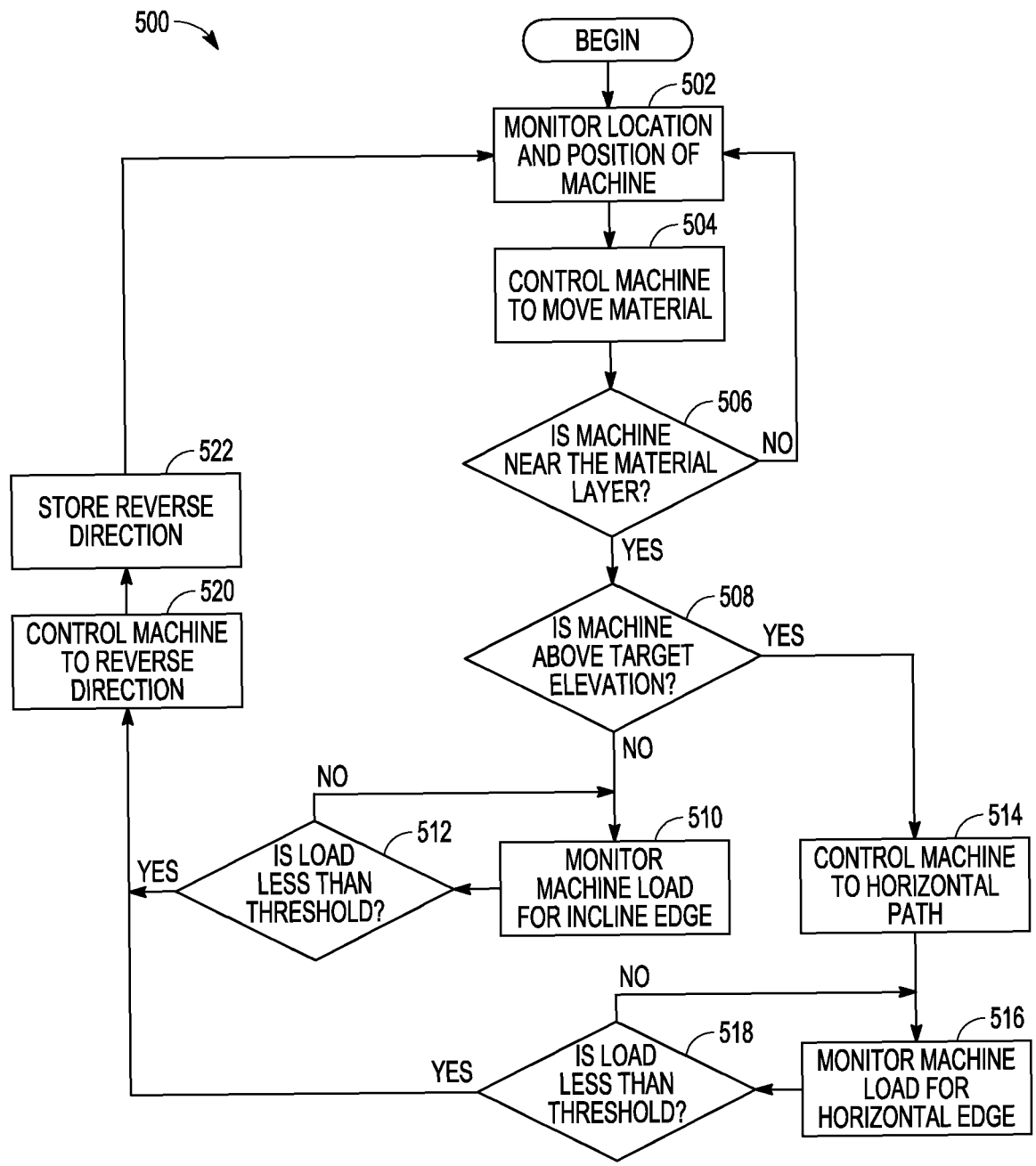
FIG. 8 illustrates one exemplary algorithm or computer-implemented method for stacking material in accordance with this disclosure.

Turning to FIG. 8, one exemplary algorithm 500 or computer-implemented method for stacking material is diagrammatically provided, according to which the control system 245 may be configured to operate. As shown in step 502, the control system monitors the location and position of machine 102. The control system controls, or instructs, the machine to move material from first work area 120 to second work area 122. It will be appreciated by those skilled in the art that the terms instruct and instructing, as used in the present disclosure, encompasses providing machine readable instructions, control signals or data that is used by the machine 102 to perform operations or tasks.

The control system 245 maps the location, including both position and elevation, of machine 102 to the work site 100 by comparing the location to work site reference points. The control system, at step 504, instructs the machine 102 to move material from first work area 120 to second work area 122 in a path toward the beginning of desired material layer 430.

When the control system determines in step 506 that the machine has reached a location near crest 428 in second work area 122 (as shown in FIG. 4), the control system controls the machine to stack the material to begin forming layer 430. Crest 428 represents the beginning location of the bottom of layer 430. It will be appreciated that the location near crest 428 can be any reference point in second work area 122 that the machine reaches before the desired stacking area for the material. Further, since crest 428 has a known elevation 422 corresponding to a top surface of previously formed layer 424 the control system can use the present elevation of the machine to determine when the machine is near the start of material layer 430.

The control system, at step 508, compares the machine elevation to a target elevation of the top 420 of material stack layer 430. If the machine is not at, or above, the target elevation, the control system monitors a load of machine 102, at step 510, using an algorithm. In one embodiment, an up-push to edge algorithm based on the angle of incline path 426 is used. In another embodiment, a horizontal, or flat, push to edge algorithm is used that assumes the machine is moving in a horizontal direction.

As explained above, control system 245 monitors outputs of machine sensors to calculate when material falls from blade 216 and is located past crest 428 along incline path 426. If the load on machine 102 drops below a calculated threshold, that represents the material has been located, machine 102 is controlled to reverse direction, at step 520, and a location of the machine reversal is stored at step 522. The machine is controlled at step 504 to continue moving material to second work area 122 and placing the material along incline path 426 until machine 102 reaches the target elevation above surface 422.

At step 508, if the control system 245 determines that machine 102 has reached the target elevation 420, the machine is controlled, at step 514, to transition from incline path 426 to a horizontal path along top surface 420, as explained above. As the machine moves along elevation 420 the control system monitors the machine load using a flat-push to edge algorithm at step 516. When a load on machine 102 is below a threshold, indicating that the material has been properly located over a horizontal edge, the machine is controlled to reverse direction and the reversal location is stored at step 520. It will be appreciated that the load threshold of step 512 can be the same load threshold of step 518.

The location where control system 245 controls machine 102 to transition to a flat push is the intersection between the existing uphill incline line 427 and the target layer height 420. It will be appreciated that the height of the top of layer 430 can be any desired height. For example, the layer height between different layers may be selected to be between three to five feet, or 1.2 meters. With a target thickness for layer 430 selected to be 1.2 meters above layer 424, the control system calculates elevation 420.

From the foregoing, it will be appreciated that while only certain embodiments have been set forth for the purposes of illustration, alternatives and modifications will be apparent from the above description to those skilled in the art.

The claimed invention is:

1. A computer-implemented method for controlling, by a control system, a material moving machine to form a new material layer on a surface of a previously laid material layer, the computer-implemented method comprising:
monitoring a location of the material moving machine in a work area;
calculating a target elevation representing a top surface of the new material layer;

controlling the material moving machine to move first material as the material moving machine travels along an inclined surface toward the target elevation;

controlling the material moving machine to deposit the first material on the surface of the previously laid material layer while the material moving machine is located below the target elevation and above the previously laid material layer, the deposited first material formed to extend the inclined surface and have a specified incline the same as that of the inclined surface;

controlling the material moving machine to move second material along the extended inclined surface;

determining whether the material moving machine, moving with the second material, reaches the target elevation;

responsive to the material moving machine being determined to have reached the target elevation and being at an end of the extended inclined surface, subsequently initiating a transition of the material moving machine to move the second material to deposit the second material on the surface of the previously laid material layer and beneath the target elevation, a portion of the deposited second material being adjacent to the first material, and the deposited second material formed to create a horizontal path at a constant elevation from where the material moving machine reaches the target elevation; and controlling the material moving machine to deposit the second material on the surface of the previously laid material layer and beneath the target elevation while the material moving machine moves along the horizontal path after reaching the end of the extended inclined surface.

2. The computer-implemented method of claim 1, wherein the control system monitors both a position and an elevation of the material moving machine in the work area.

3. The computer-implemented method of claim 1, wherein the material moving machine is a dozer having a blade to move material.

4. The computer-implemented method of claim 3, wherein the control system controls the dozer to move material with the blade along the inclined surface, and the control system is configured to calculate a load on the dozer to determine when the blade has moved the first material over an edge of the inclined surface.

5. The computer-implemented method of claim 3, wherein the control system controls the dozer to move material with the blade along the horizontal path, and the control system is configured to calculate a load on the dozer to determine when the blade has pushed the second material over an edge of the horizontal path.

6. The computer-implemented method of claim 1, wherein the target elevation is a predetermined height above the previously laid material layer.

7. The computer-implemented method of claim 1, wherein the control system calculates a load of the material moving machine to determine when the load of the material moving machine is below a threshold load value.

8. The computer-implemented method of claim 1, wherein the control system comprises a first controller located with the material moving machine and a second controller located remote from the material moving machine.

9. A control system for controlling operation of a material moving machine to form a new material layer on a surface of a previously laid material layer, the control system comprising:
a memory configured to retrievably store one or more algorithms; and
a controller in communication with the memory, the controller, based on the one or more algorithms, configured to:
instruct the material moving machine to move material from a first work area to a second work area,
instruct the material moving machine to travel along an incline path in the second work area to move first material while the material moving machine is located below and moving toward a target elevation,
instruct the material moving machine to deposit the first material on the surface of the previously laid material layer while the material moving machine is located below the target elevation and above the previously laid material layer, the first material formed to have a specified incline,
instruct the material moving machine to travel along the incline path toward the target elevation to move second material,
determine when the material moving machine, traveling toward the target elevation along the incline path with the second material, reaches the target elevation,
when the material moving machine is traveling toward the target elevation along the inclined path and determined to have reached the target elevation, initiate a transition of the material moving machine from the incline path to deposit the second material on the surface of the previously laid material layer adjacent the first material and beneath the target elevation and to travel along a horizontal path formed by the deposited second material at a constant elevation in the second work area, and
instruct the material moving machine to deposit the second material on the surface of the previously laid material layer adjacent the first material and beneath the target elevation, the depositing of the second material including the material moving machine moving along the horizontal path to complete the deposit of the second material.

10. The control system of claim 9, wherein the controller is configured to calculate the target elevation based on an elevation of the previously laid material layer in the second work area.

11. The control system of claim 9, wherein the controller monitors outputs from material moving machine sensors and is configured to calculate a load on the material moving machine based at least in part on the outputs.

12. The control system of claim 9, wherein the controller comprises a first controller located with the material moving machine and a second controller located remote from the material moving machine.

13. An autonomous method of mining using a dozer comprising a drive mechanism to move the dozer in forward and reverse directions, an adjustable blade for pushing material when the dozer moves in the forward direction, and a location position sensor to determine a position of the dozer, the method comprising:
monitoring a location of the dozer;
calculating a target elevation of a new material layer to be formed in a work area on a surface of a previously laid material layer;

controlling, using processing circuitry, the dozer according to first electronic instructions to the drive mechanism and the adjustable blade of the dozer to move the dozer along an incline path toward the target elevation to move first material in the work area;

controlling, using the processing circuitry, the dozer according to second electronic instructions to the drive mechanism and the adjustable blade of the dozer to deposit the first material on the surface of the previously laid material layer while the location of the dozer is below the target elevation and above the previously laid material layer, the first material formed at a specified incline;

determining, using the processing circuitry, when the dozer is on the incline path and moving toward the target elevation with second material, whether the dozer is at an elevation equal to or greater than the target elevation;

controlling, using the processing circuitry, the dozer according to third electronic instructions to the drive mechanism and the adjustable blade of the dozer to move the dozer along the incline path to move second material and transition the dozer from the incline path to move along a horizontal path at a constant elevation when the location of the dozer is determined to reach the elevation equal to or greater than the target elevation; and controlling, using the processing circuitry, the dozer according to fourth electronic instructions to deposit the second material on the surface of the previously laid material layer subsequent to the first material and beneath the target elevation, a portion of the deposited second material being adjacent to the previously laid material layer and a portion of the second material being deposited while the dozer moves along the horizontal path.

14. The method of claim 13, wherein said calculating the target elevation comprises:
retrieving from a memory a top elevation of the previously laid material layer; and
calculating the target elevation based on the top elevation and a target material layer thickness.

15. The method of claim 13, further comprising:
monitoring outputs of sensors of the dozer while the dozer is located within the work area;
calculating a load on the dozer based upon the sensor outputs; and
controlling, using the processing circuitry, the dozer according to instructions to the dozer to reverse direction from the forward direction to the reverse direction when the calculated load is below a predetermined threshold level.

16. The method of claim 13, wherein said controlling the dozer according to the first, second, and third electronic instructions comprises providing machine readable instructions from a control system.

17. The method of claim 16, wherein the control system comprises a first controller located with the dozer and a second controller located remote from the dozer.

* * * * *